United States Patent [19]
Kamiya

[11] 3,808,703
[45] May 7, 1974

[54] VEHICLE DRYING APPARATUS
[75] Inventor: Nobuyoshi Kamiya, Takarazukashi, Japan
[73] Assignee: Toyo Enterprises Kabushiki Kaisha, Osaka, Japan
[22] Filed: Dec. 7, 1972
[21] Appl. No.: 313,103

Related U.S. Application Data
[63] Continuation of Ser. No. 61,065, Aug. 5, 1970, abandoned.

[52] U.S. Cl. .............................. 34/229, 34/243 C
[51] Int. Cl. ........................................... F26b 19/00
[58] Field of Search.......... 34/229, 243, 243 C, 222, 34/DIG. 13; 15/DIG. 2, DIG. 7, 405; 239/536, 545, 186

[56] References Cited
UNITED STATES PATENTS
3,459,203  8/1969  Pritchard........................... 239/186
3,279,093  10/1966  Dutton............................... 34/229
3,375,592  4/1968  Heinicke et al........................ 34/87
7,140  6/1832  Hale................................... 100/264
3,442,027  5/1969  Hurwitz.............................. 34/229
3,613,255  10/1971  Capri................................. 34/229

Primary Examiner—John J. Camby
Assistant Examiner—James C. Yeung
Attorney, Agent, or Firm—Eyre, Mann & Lucas

[57] ABSTRACT

This invention provides a vehicle drying apparatus including an upper air-blowing nozzle and a pair of side air-blowing nozzles, the former being automatically adjusted, and the latters being previously adjusted by hand, in relation to a vehicle to be dried, so that the vehicle can be dried by air under pressure through these blowing nozzles with adequate distances therebetween.

4 Claims, 4 Drawing Figures

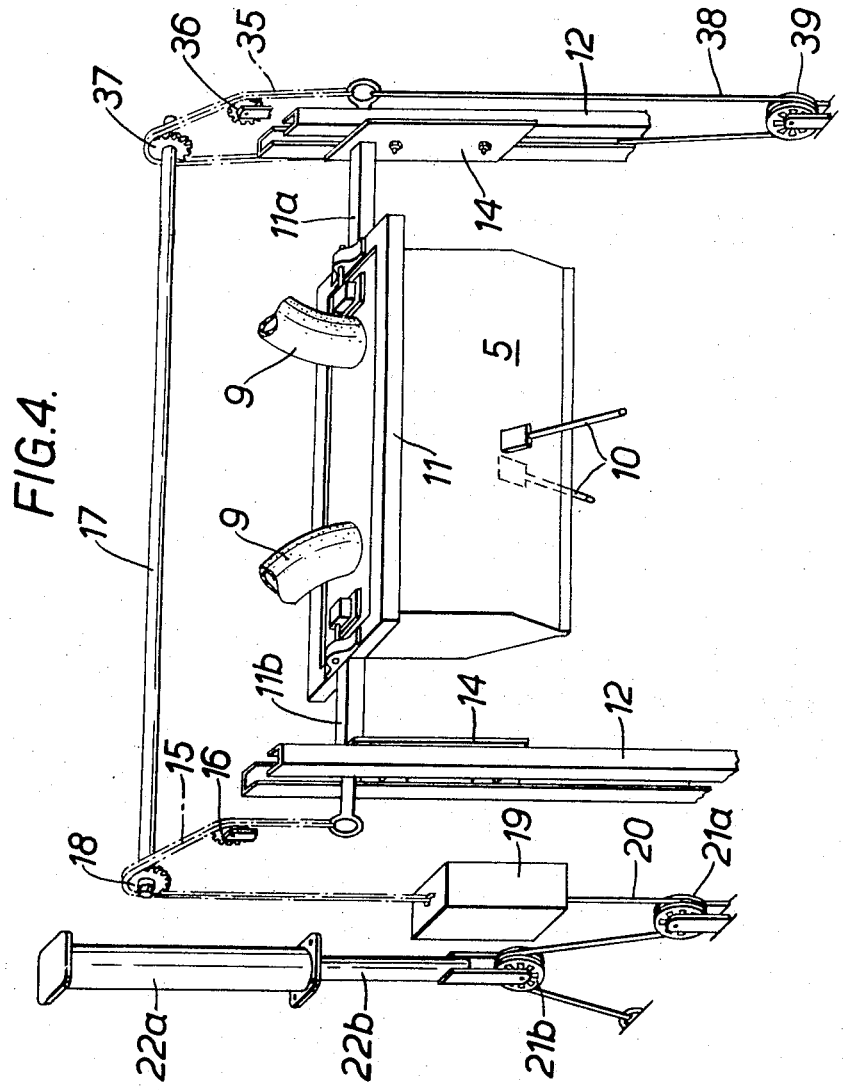

VEHICLE DRYING APPARATUS

This is a continuation, of application Ser. No. 61,065, filed Aug. 5, 1970 now abandoned.

This invention relates to a vehicle drying apparatus which, on a travelling frame, has an upper box-shaped blowing nozzle and a pair of side box-shaped blowing nozzles, both of which are adjustable in relation to a vehicle to be dried.

In general, a successive vehicle washing equipment calls for labour-saving and time-saving consideration; specifically, it is desired that a vehicle should be washed and dried as soon as possible, with minimum of labour. So far as a drying equipment is concerned, a vehicle has varying surface contours such that it is difficult for air blowing through nozzles to reach each part of the vehicle surface without reducing the drying effect. The vehicle upper surface ranging from the lowest parts at the front and the rear and the bumpers to the highest parts on the roof, varies to a much greater extent than its side which are surfaces usually designed to be flat or stream-lined.

This invention provides a vehicle drying apparatus including an upper box-shaped nozzle and a pair of side box-shaped nozzles, both of which are designed so as to supply air under pressure, and to be adjustable in relation to a vehicle to be dried.

The invention will be particularly described by way of example with reference to the drawings, in which:

FIG. 4 is a schematical view showing a means for moving the upper blowing nozzle assembly in a perpendicular manner.

Figure 1:
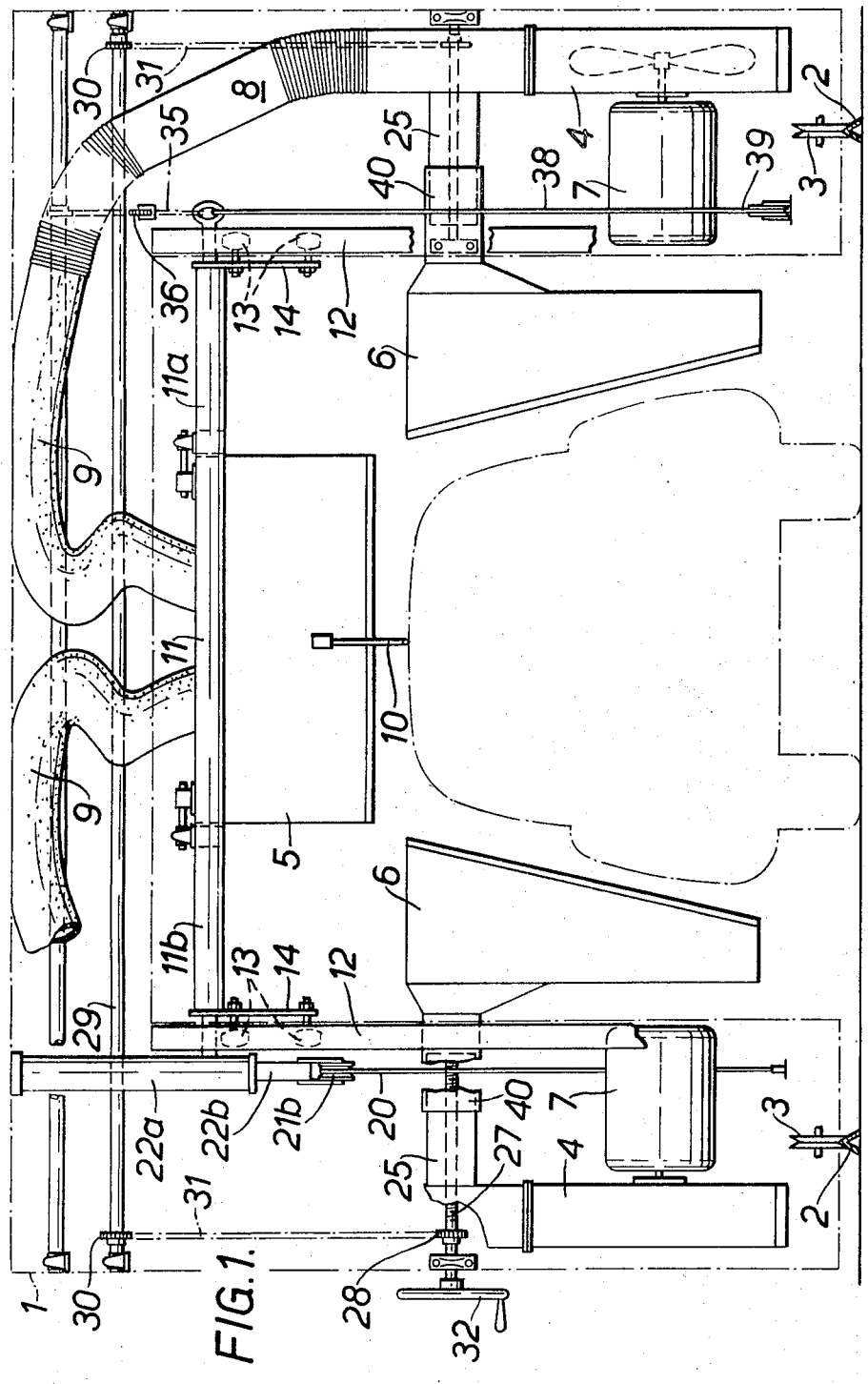
FIG. 1 is a front view of an apparatus constructed in accordance with the present invention.
Figure 2:
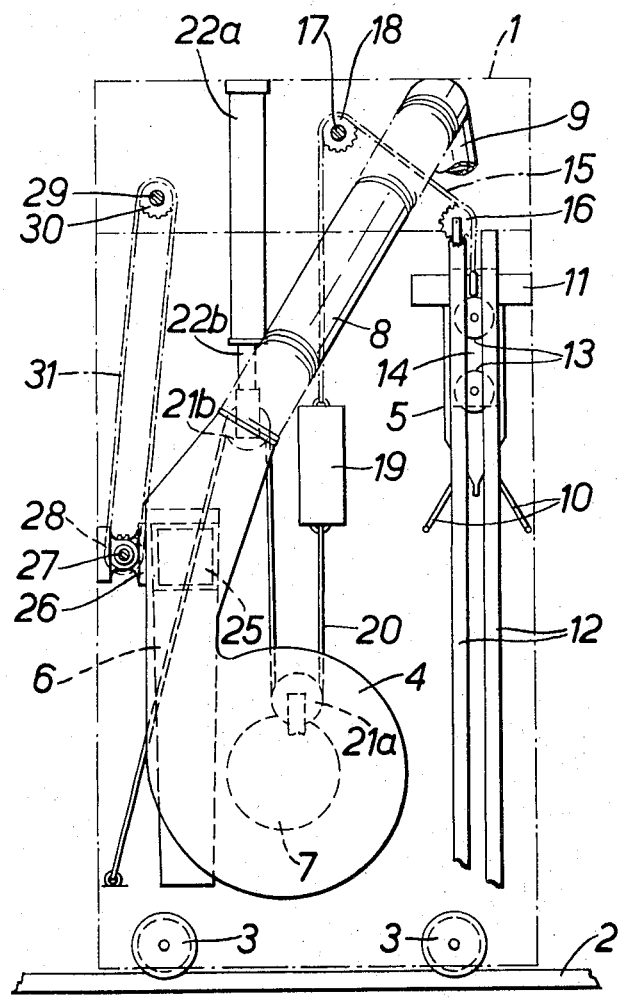
FIG. 2 is a left-side view of the apparatus illustrated in FIG. 1.
Figure 3:
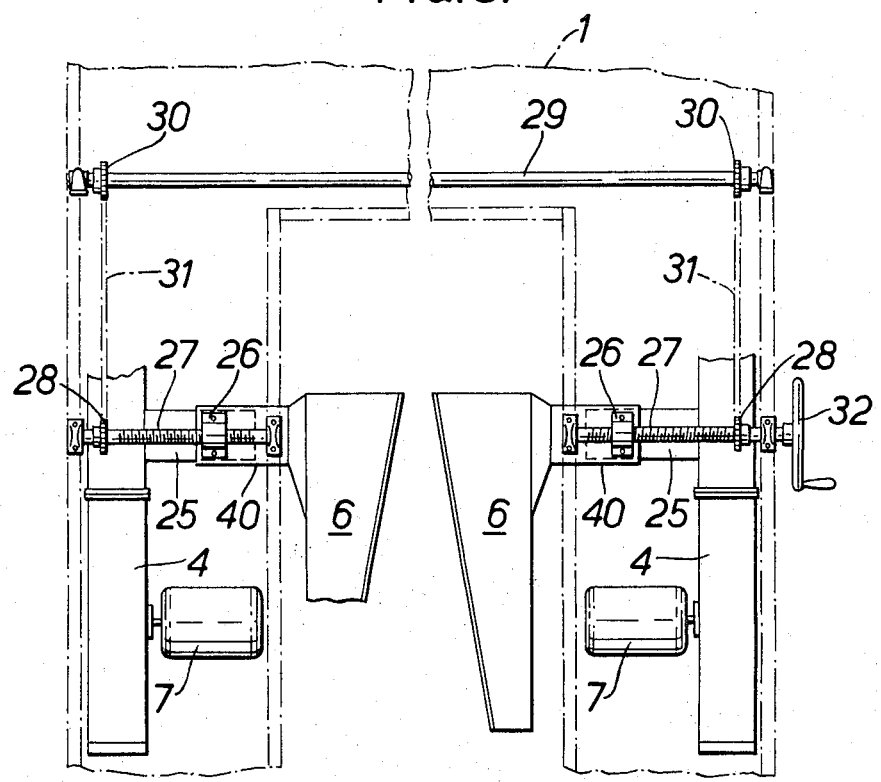
FIG. 3 is a view showing the back of the side blowing nozzle assemblies.

A travelling frame 1 with wheels 3 runs on rails 2. Within the travelling frame 1, an upper box-shaped nozzle 5 is horizontally provided. The nozzle 5 is supplied with air through ducts 8 connected to blowers 4, which are driven by motors 7. The air ducts 8 include flexible portions 9 such as a rubber hose, and are by-passed to provide by-pass pipes 25 connected to each side nozzle 6, in which the by-pass pipes 25 are slidably inserted in the sleeves 40 of the side nozzles 6.

The side nozzles 6 have sleeves 40 accepting the by-pass pipes 25. The sleeves 40 are connected to the outermost walls of the travelling frame 1 by threaded rods 27, which are rotatably supported in bearings 26 mounted on the sleeves 40. A handle 32 is detachably capped on either of the threaded rods 27. The threaded rods 27 are inversely threaded with the same pitch, and are connected to a connecting rod 29 by chains 31 and chain-wheels 28 on the threaded rods 27. Thus, the threaded rods 27 are rotated simultaneously by the handle 32, causing the side nozzles 6 to move inwards or outwards in relation to the vehicle to be dried.

Referring to FIG. 4, the upper nozzle 5 is supported on a supporting frame, which comprises a rectangular frame 11, and supporting arms 11–a and 11–b, in such a manner as to be capable of swinging in the direction of travel of the travelling frame 1. The supporting arm 11–a and 11–b are fastened to carriers 14, which are provided with wheels 13 so as to descend and ascend along rails 12. The terminating end of the arm 11–b is connected to a weight 19 by a chain 15 through chain-wheels 16 and 18. The weight 19 is connected to the piston rod 22–b of an air cylinder 22–a by a wire-rope 20 through pulleys 21–a and 21–b, so that the movement of the piston rod 22–b is communicated to the weight 19, effecting the ascent or descent of the nozzle supporting frame 11. The weight 19 functions as a counterbalance for the upper nozzle 5. The end portion of the arm 11–a is tied with a chain 35 and a wire-rope 38, which extend in the opposite directions, meeting at the place where the arm 11–a is fastened to the carrier 14, with the chain 35 running on chain-wheels 36 and 37, and with the rope 38 running on a pulley 39. The chain-wheels 18 and 37 are fixed on a connecting shaft 17, which is horizontally arranged in the upper frame 1. Under the system thus constructed, the movement of the piston rod 22–b is communicated equally to both ends of the nozzle-supporting arms 11–a and 11–b, so that the upper nozzle 5 can descend and ascend through the actuation of the air cylinder 22–a.

The air cylinder 22–a is actuated through a magnetic valve (not shown) connected to a limit-switch 10, which is attached so as to project downwards from the nozzle 5. In the example illustrated a pair of switches 10 are used, in which the air-cylinder 22–a is actuated when either of the switches 10 comes in touch with the vehicle surface, causing the piston rod 22–b to rise by the compressed air. But when the switch 10 comes out of contact with the vehicle surface, the air cylinder 22–a is deenergised, causing the nozzle 5 to descend by gravity. In this way the air cylinder 22–a is repeatedly actuated and deenergised through either of the switches 10, thereby causing the nozzle 5 to descend and ascend within a small amplitude. The air cylinder can of course be replaced by an oil-hydraulic cylinder, or a reversible torque motor.

The operation and advantages of the present invention will be described in the following:

In accordance with the size of a vehicle to be dried, the side nozzles 6 are adjusted by the handle 32, and then the travelling frame starts to travel through the actuation of the pushbutton on the control panel; at the same time, the blowers 4 are driven by the motors 7. As the travelling frame moves forwards, the limitswitch 10 comes into contact with the stationary vehicle, closing the circuit of the air cylinder 22–a, thereby raising the nozzle 5 blowing air over the upper surfaces of the vehicle. But as soon as the limit-switches 10 come out of the vehicle surface, the air cylinder 22–a is deenergised through the opening of the circuit, so that the nozzle 5 comes down by gravity, counterbalanced by the weight 19 so as to move slowly. On the other hand, in ascending the nozzle 5 is helped by the weight 19. In this way the blowing nozzle 5 is automatically adjusted, and the pair of side nozzles are manually adjusted, so as to be in an adequate position to the vehicle surface. In view of the flat side surfaces of a vehicle, a manual adjustment is sufficient for the side nozzles. When the travelling frame passes the stationary vehicle, it may be reversely travelled, finishing the complete drying of the entire body, in which each blowing nozzle is operated in the same way as mentioned above. In accordance with the present invention a vehicle is dired efficiently with an adequate distance between the air blowing nozzles and the vehicle surfaces, irrespective of the size of the vehicle to be dried.

What is claimed is:

1. A vehicle drying apparatus mounted on a traveling carrying frame which is adapted to traverse a vehicle to be dried from front to rear and from rear to front, which comprises:
   a. upper blowing means;
   b. side blowing means;
   c. means for supporting and automatically adjusting the vertical and axial position of said upper blowing means, said supporting and adjusting means being operative to move said upper blowing means in a vertical and axial direction, said supporting and adjusting means being further operative to swing and maintain said upper blowing means pointed in the direction of travel of said traveling carrying frame as said carrying frame traverses said vehicle both from front to rear and from rear to front, said supporting and adjusting means comprising electrically controlled fluid means comprising a piston cylinder and a piston rod, and mechanical counterweight means in combination therewith for raising and lowering said upper blowing menas, said mechanical counterweight means comprising a weight connected by mechanical means at opposite ends thereof to said upper blower supporting means and to said piston rod of said fluid means; and
   d. mechanical means for manually adjusting and rigidly fixing the horizontal position of said side blowing means, which comprises first and second oppositely disposed rods of opposite thread and same pitch, each of said rods being connected by bearing means to said side blowing means, means directly connected to said first rod and adapted to be manually rotated thereby rotating said first rod, and means coupling rotation of said first rod to said second rod whereby said side blowing means move in opposite directions when said means to rotate said first rod are manually rotated.

2. The vehicle drying apparatus of claim 1 wherein said fluid means are pneumatic.

3. The vehicle drying apparatus of claim 2 wherein said electrical means comprise at least one contact switch having an actuating lever connected thereto, and a magnetic valve for automatically controlling said fluid means, said actuating lever projecting downward from said upper blowing means and adapted to directly contact the vehicle being dried.

4. The vehicle drying apparatus of claim 1 wherein said upper and said side blowing means comprise box-shaped blowing nozzles.

* * * * *

UNITED STATES PATENT OFFICE
CERTIFICATE OF CORRECTION

Patent No. 3,808,703　　　　　　　　Dated May 7, 1974

Inventor(s)　Nobuyoshi Kamiya

It is certified that error appears in the above-identified patent and that said Letters Patent are hereby corrected as shown below:

In Column 1 before [52] insert:

-- Foreign Application Priority Data

August 6, 1969　Japanese......62154/69--

Column 1, line 21

"its side which are surfaces" should read

--its side surfaces which are--.

Signed and sealed this 15th day of October 1974.

(SEAL)
Attest:

McCOY M. GIBOSN JR.　　　　　　C. MARSHALL DANN
Attesting Officer　　　　　　　Commissioner of Patents

UNITED STATES PATENT OFFICE
CERTIFICATE OF CORRECTION

Patent No. 3,808,703            Dated May 7, 1974

Inventor(s) Noobuyshi Kamiya

It is certified that error appears in the above-identified patent and that said Letters Patent are hereby corrected as shown below:

On the cover sheet insert:

-- [30] Foreign Application Priority Data

Japan         62154/69         Aug. 6, 1969 --.

Signed and sealed this 29th day of October 1974.

(SEAL)
Attest:

McCOY M. GIBSON JR.            C. MARSHALL DANN
Attesting Officer               Commissioner of Patents